2,986,527
INFRARED TRANSMITTING OPTICAL FILTER

David Redfield, Fairview Park, and Ruth L. Baum, Cleveland, Ohio, assignors to Union Carbide Corporation, a corporation of New York No Drawing. Filed July 22, 1957, Ser. No. 673,172

3 Claims. (Cl. 252—300)

This invention relates to an optical device capable of selectively transmitting infrared radiation and refers more particularly to such a device especially adapted to the selective transmission of radiation in the wave length range of 9 to 12 microns.

The invention is based upon the discovery that pressed boron nitride powder when in an air atmosphere has the property of transmitting infrared radiation in wave lengths of 5 to 6 microns, and the further discovery that by associating boron nitride powder with materials of suitable infrared index of refraction, selective transmission of infrared radiation of wave lengths in the range 9 to 12 microns can be obtained. Thus, boron nitride, in an environment having an infrared index of refraction of approximately 1 transmits infrared radiation of wave length of about 5.4 microns. However, when boron nitride is admixed with a matrix of material which is transparent in the infrared and has an infrared index of refraction in the range 2 to 5, infrared radiation having a wave length of 9 to 12 microns is selectively transmitted, shorter wave lengths being substantially attenuated. Such combinations of matrix material and boron nitride powder also transmit infrared radiation of wave lengths 13 to 16 microns, but wave lengths in the range 12 to 13 are attenuated by them.

The invention accordingly comprises an optical filter capable of transmitting selectively infrared radiation of wave length 9 to 12 microns, which filter is composed of boron nitride in a matrix of a material transparent to infrared and having an infrared index of refraction in the range 2 to 5, which material is mechanically and optically stable at temperatures at least as high as 300° C. Conveniently, a device in accordance with the invention is prepared by mixing powdered boron nitride with powdered material having the refraction and heat stability properties described. The mixture of powders is then pressed, hot or cold, into suitable form such as a cylinder, from which a thin sheet or disc may be obtained. Alternatively, a disc or other desired shape such as a lens of suitable size may be produced directly. The so produced shape may be polished and desirably may be coated with an anti-reflective coating of the type conventionally applied to lenses.

Among materials possessing the refraction and heat stability properties required are silicon, germanium, indium antimonide, zinc sulfide, cadmium sulfide, and halides of thallium, for instance thallium bromoiodide. A preferred material is thallium bromoiodide, which is composed of substantially 42% thallium bromide and 58% thallium iodide.

For the preparation of an optical filter in accordance with this invention, to a quantity of thallium bromoiodide in powdered form may be added about 0.5% to 5% of powdered boron nitride. A preferred proportion of boron nitride is 2% by volume. The blended powders are compacted at extremely high pressure, for example, greater than about 200,000 pounds per square inch, to produce a desired shape, ordinarily a thin, flat disc. The disc so produced may be utilized as a filter or "window" for the transmission of infrared radiation of 9 to 12 microns wave length.

As a specific example of the practice of the invention, the following may be cited.

One milligram of boron nitride powder was admixed with 300 milligrams of thallium bromoiodide of the composition recited above. The mixture was pressed at 270,000 pounds per square inch to produce a flat disc ⅜" in diameter and 0.025 inch thick. When subjected to infrared radiation, discs so prepared have transmitted up to 20% of the incident infrared radiation between 9 to 12 microns.

The particle size of the materials used in the preparation of filters in accordance with the invention is not critical. For ease of handling and pressing, it is desirable that the powders be composed of particles sufficiently small to pass a 100 mesh to 200 mesh screen (0.147 mm. to 0.074 mm. openings).

A particular advantage of the device of the invention is that it, in common with the earth's atmosphere, transmits infrared radiation which bodies near room temperature emit most strongly. Furthermore, all shorter wave lengths of infrared and visible light are strongly attenuated by the device. This combination of properties is highly desirable in the sensing of heat radiation because these other radiations are often present in higher intensities than the desired 9 to 12 micron wave length radiations and many detectors used in this spectral range are more sensitive to these shorter wave lengths. Both of these factors contribute to the great importance of the instant invention for use in such devices as heat detection and long range infrared homing and signal transmission systems.

We claim:

1. An optical filter capable of selectively transmitting infrared radiation of 9 to 12 microns wave length, said filter being composed of boron nitride powder in a matrix of a compressed, powdered material selected from the group consisting of silicon, germanium, indium antimonide, zinc sulfide, cadmium sulfide and thallium halide, said material being transparent to infrared and having an infrared index of refraction in the range 2 to 5, which material is mechanically and optically stable at temperatures up to at least 300° C., said boron nitride being present in a proportion of 0.5% to 5% by volume in said filter.

2. A filter as defined in claim 1 in which said material is thallium bromoiodide.

3. A filter as defined in claim 2 in which said boron nitride is present in a proportion of substantially 2% by volume.

References Cited in the file of this patent

UNITED STATES PATENTS

| | | |
|---|---|---|
| 2,547,173 | Ritter | Apr. 3, 1951 |
| 2,671,154 | Burstein | Mar. 2, 1954 |